US006782284B1

(12) United States Patent
Subramanyan et al.

(10) Patent No.: US 6,782,284 B1
(45) Date of Patent: *Aug. 24, 2004

(54) METHOD AND APPARATUS FOR SEMI-AUTOMATIC ANEURYSM MEASUREMENT AND STENT PLANNING USING VOLUME IMAGE DATA

(75) Inventors: Krishna Subramanyan, Solon, OH (US); Shalabh Chandra, Twinsburg, OH (US); Scott Kenneth Pohlman, Willoughby, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 69 days.

This patent is subject to a terminal disclaimer.

(21) Appl. No.: 09/990,010

(22) Filed: Nov. 21, 2001

(51) Int. Cl.$^7$ ................................................. A61B 5/05

(52) U.S. Cl. ..................... 600/407; 600/410; 600/419; 600/425; 600/454; 600/465; 382/128; 382/130; 382/131; 382/133; 378/4; 378/21

(58) Field of Search .................................. 600/407, 425, 600/426, 429, 436, 410, 414, 481, 424, 437, 443, 454, 465, 463, 483; 382/128, 130, 131, 133, 4; 378/21, 22, 23, 24, 25, 27

(56) References Cited

U.S. PATENT DOCUMENTS

| 5,699,799 | A | | 12/1997 | Xu et al. ................. 128/653.1 |
| 5,891,030 | A | | 4/1999 | Johnson et al. ............. 600/407 |
| 6,152,878 | A | * | 11/2000 | Nachtomy et al. .......... 600/467 |
| 6,169,917 | B1 | | 1/2001 | Masotti et al. .............. 600/407 |
| 6,272,370 | B1 | * | 8/2001 | Gillies et al. ............... 600/411 |
| 6,728,566 | B1 | * | 4/2004 | Subramanyan et al. ..... 600/407 |

FOREIGN PATENT DOCUMENTS

WO    WO 01/26055 A2    4/2001

OTHER PUBLICATIONS

Loncaric, S., et al. "3–D Deformable Model for Aortic Aneurysm Segmentation From CT Images", Proc. of 22$^{nd}$ Annual EMBS Int'l Conf., Jul. 23–28, 2000 Chicago, IL; vol. 1, pp 398–401 XP010530302.

Noordmans, et al. "High Accuracy Tracking of 2D/3D Curved Line–Structures by Consecutive Cross–Section Matching", Pattern Recognition Letters, vol. 19, No. 5, pp. 97–111, 1998.

Prinet, et al. "Vessels Representation in 2D and 3D Angiograms", CAR '97 Computer Assisted Radiology and Surgery, Lemke, et al., Elsevier Science, pp. 240–245, 1997.

(List continued on next page.)

Primary Examiner—Angela D. Sykes
Assistant Examiner—William C. Jung
(74) Attorney, Agent, or Firm—Fay, Sharpe, Fagan, Minnich & McKee, LLP

(57) ABSTRACT

An apparatus for measuring parameters preparatory to a stent replacement of an aneurytic blood vessel in a patient (26) includes a computed tomography (CT) scanner (10) that acquires image data (28) corresponding to multiple two-dimensional image slices. A reconstruction processor (32) reconstructs a three-dimensional image representation (34) from the image data (28). A tracking processor (40) produces a tracked vessel (92) including at least a centerline (80) and selected vessel boundaries (86). A user interface (44) displays a rendering (242) of the image representation to an associated user (42), measures selected vascular parameters corresponding to the stent parameters (276), and graphically superimposes the measured parameters on the rendering of the image representation (270, 272).

25 Claims, 11 Drawing Sheets

OTHER PUBLICATIONS

Lindeberg, "Feature Detection with Automtic Scale Selection", Int. J. Computer Vision, vol. 30, No. 2, pp. 79–116, 1998.

Stein, et al. "Tracing of Thin Tubular Structures in Computer Tomographic Data", Computer Aided Surgery, vol. 3, pp. 83–88, 1998.

Whitaker, "Imaging of Abdominal Aortic Aneurysm Before and After Endoluminal Stent–Graft Repair", Eur. J. of Radiology, vol. 39, 2001.

Kompatsiaris, et al., "Deformable Boundary Detection of Stents in Angiographic Images", IEEE TMI, vol. 19, No. 6, Jun. 2000.

Ravhon, et al., "Validation of Ultrasonic Image Boundary Recognition in Abdominal Aortic Aneurysm", IEEE TMI, vol. 20, No. 8, 2001.

Kass, et al., "Snakes: Active Contour Models", Int. J. Computer Vision, vol. 1, No. 4, pp. 321–331, 1988.

* cited by examiner

☼ Landmark

METHOD AND APPARATUS FOR SEMI-AUTOMATIC ANEURYSM MEASUREMENT AND STENT PLANNING USING VOLUME IMAGE DATA

BACKGROUND OF THE INVENTION

The present invention relates to the medical imaging arts. It particularly relates to the measurement of aneurysms and planning for surgical replacement thereof by synthetic stents using image data generated by multiple-slice computed tomography (CT), and will be described with particular reference thereto. However, the invention will also find application in conjunction with other imaging techniques such as magnetic resonance-based imaging (MRI) or nuclear medicine, as well as in acquiring and analyzing data which is useful for other types of medical procedure planning.

The development of multi-slice CT systems having increasingly improved resolution particularly in the slice-direction is making CT imaging of vascular systems attractive for clinical applications such as the discovery of potentially life-threatening aneurysms and the precise measurement of such an aneurysm in order to design a synthetic replacement stent and plan the surgical implantation thereof. However, for CT to gain clinical acceptance in this area, reconstruction and post-processing of the images should be automated to the greatest extent possible. Automation becomes increasingly important with multi-slice CT because of the much greater amount of data (i.e., number of slices) produced by the instrument.

Currently, imaging analyses for identifying and measuring aneurysms are cumbersome and laborious. Prior art systems typically employ maximum intensity projections (MIPS) which lose much of the valuable three-dimensional information available from a multi-slice CT scan. These methods are usually manual, and do not provide for efficient workflow, operator guidance, or means for verifying the stent measurements.

The present invention contemplates an improved method and apparatus for semi-automatic aneurysm measurement and stent planning using volume image data which overcomes the aforementioned limitations and others.

SUMMARY OF THE INVENTION

According to one aspect of the invention, a method for tracking a blood vessel containing an aneurysm in a three-dimensional image is disclosed. A blood vessel type is identified. Vascular landmarks are received from an associated user. An orthogonal vessel plane is extracted. A vessel center is located in the vessel plane. Vessel edges in the vessel plane are fitted. The extracting, locating, and fitting are recursively repeated a plurality of times to track the vessel.

According to another aspect of the invention, a method for assisting an associated user in planning a stent replacement of a blood vessel in an associated patient is disclosed. A three-dimensional vascular image is acquired that includes imaging of the vessel to be replaced. The vessel to be replaced is tracked in the three-dimensional vascular image. The vessel tracking includes at least extraction of a vessel centerline and vessel boundaries. Stent parameters are measured based on the vessel tracking.

According to yet another aspect of the invention, an apparatus is disclosed for measuring parameters preparatory to a stent replacement of an aneurytic blood vessel in an associated patient. A computed tomography (CT) scanner acquires image data corresponding to multiple two-dimensional image slices. A reconstruction processor reconstructs a three-dimensional image representation from the image data. A tracking processor produces a tracked vessel including at least a centerline and selected vessel boundaries. A user interface displays a rendering of the image representation to an associated user, measures selected vascular parameters corresponding to the stent parameters, and graphically superimposes the measured parameters on the rendering of the image representation.

According to still yet another aspect of the invention, an apparatus is disclosed for measuring stent parameters preparatory to a stent replacement operation. A means is provided for acquiring three-dimensional image data. A means is provided for reconstructing the image data into a three-dimensional image representation. A means is provided for tracking the blood vessel to be replaced. The tracking includes at least estimation of a vessel centerline and selected vessel boundaries in three-dimensions. A means is provided for displaying a rendering of the image representation to an associated user. A means is provided for measuring selected vascular parameters corresponding to the stent parameters.

One advantage of the present invention is that it operates directly on the three-dimensional data and performs the tracking in 3-D.

Another advantage of the present invention is that it provides for measurement of both the true and the false lumen of an aneurysm.

Another advantage of the present invention is that the vessel branches are identified and optionally tracked for a pre-selected distance to ascertain that adequate stent-anchoring branch portions are available.

Yet another advantage of the present invention is that it facilitates stent measurements in accordance with the stent manufacturer's specifications.

Still yet another advantage of the present invention is that it provides intuitive graphical feedback comparing the stent measurements and the stent structure with the acquired vascular images.

Numerous additional advantages and benefits of the present invention will become apparent to those of ordinary skill in the art upon reading the following detailed description of the preferred embodiments.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
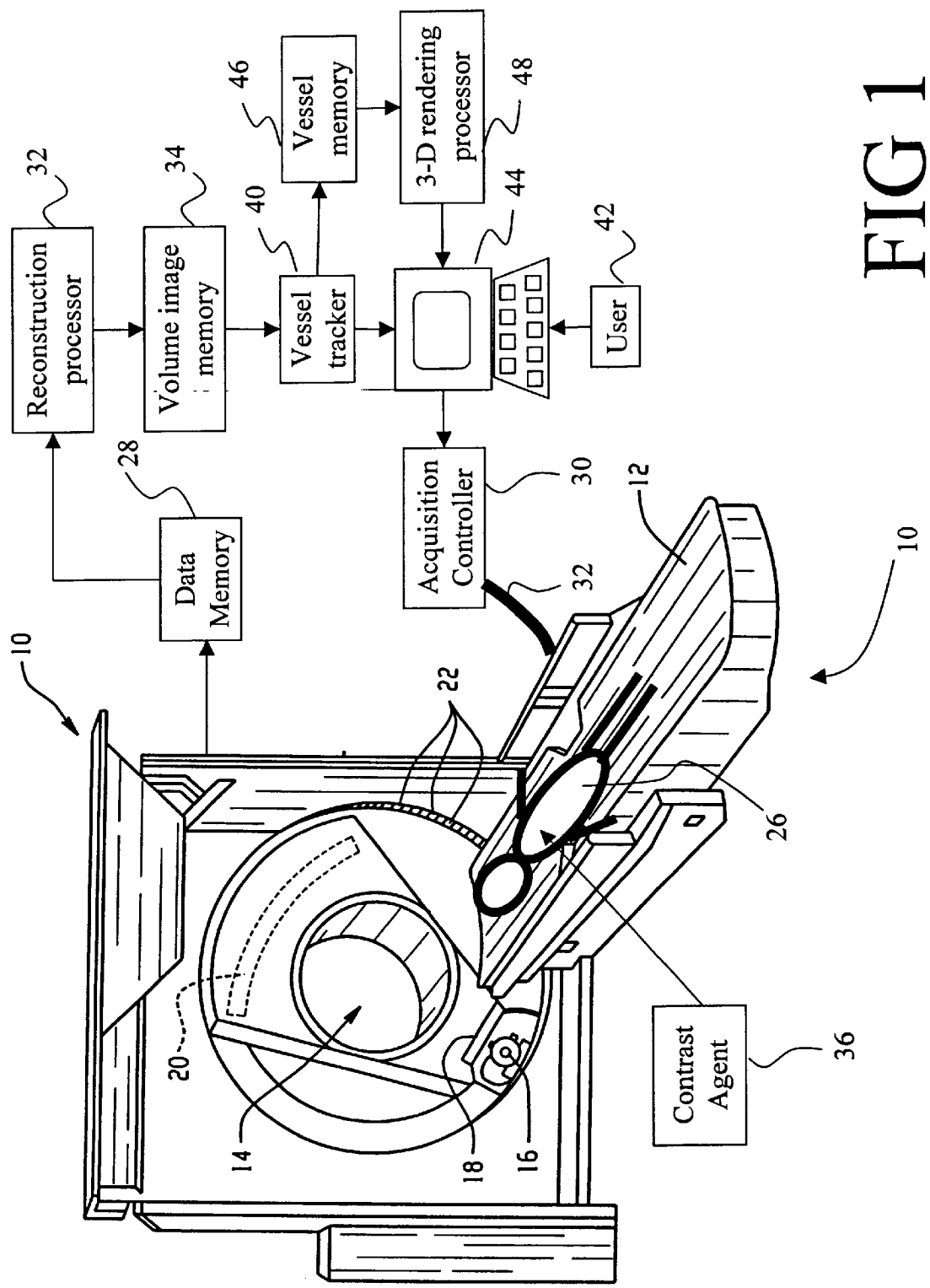
FIG. 1 schematically shows an exemplary multi-slice CT imaging system that suitably practices an embodiment of the invention.

With reference to FIG. 1, a multiple-slice computed tomography (CT) scanner 10 includes a patient support 12 such as a patient bed which is linearly movable inside an examination region 14. An x-ray tube assembly 16 mounted on a rotating gantry projects a cone beam or a plurality of parallel fan beams of radiation through the examination region 14. A collimator 18 collimates the radiation beam or beams in two dimensions. In third generation scanners, a two-dimensional x-ray detector 20 is disposed on the rotating gantry across the examination region from the x-ray tube. In fourth generation scanners, an array of two-dimensional detector rings 22 is mounted on a stationary gantry around the rotating gantry.

Whether third or fourth generation, the x-ray detectors 20, 22 operate in known ways to convert x-rays that have traversed the examination region 14 into electrical signals indicative of x-ray absorption between the x-ray tube 16 and the detectors 20, 22. The x-ray absorption signals, along with information on the angular position of the rotating gantry, are communicated to a data memory 28.

An acquisition controller 30 communicates 32 with the CT scanner 10 to control CT scanning of a patient 26. The data is reconstructed by a reconstruction processor 32 which reconstructs the x-ray absorption data into a plurality of CT image slices stored in a CT volume image memory 34. The reconstruction processor 32 operates using the filtered back-projection technique known to the art or using other reconstruction techniques.

In another suitable embodiment (not shown), the patient couch advances continuously such that the data acquisition occurs over a spiral geometry. The resulting spiral data is reconstructed into a three-dimensional image again stored in image memory 34. Those skilled in the art will also recognize that the invention is not limited to CT, but is also applicable to magnetic resonance imaging (MRI) and other methods capable of three-dimensionally imaging tubular biological structures.

In order to emphasize the vasculature, a contrast agent 36, such as an iodine-based contrast agent, is administered to the patient 26.

A vessel tracker 40 advantageously tracks the vessel containing the aneurysm based on landmarks supplied by an associated user 42 through a user interface 44, which is preferably, interactive. As the vessel tracker tracks the vessel with the aneurysm, key vessel-defining characteristics such as the vessel center and periphery information are stored in a vessel memory 46. A three-dimensional surface rendering processor 48 generates a 3-D representation, optionally rotatable, of the tracked vessel. The user interface 44 also permits selective viewing of the contents of the three-dimensional volume image memory 34, the output of the tracker 40, and the 3-D rendering. Further, the user interface 44 allows the user 42 to communicate with and direct the data acquisition controller 30 so that the user 42 can operate the CT scanner 10.

The apparatus embodiment of FIG. 1 is exemplary only. Those skilled in the art will be able to make modifications to suit particular applications. For example, the user interface 44 can include other components, such as printers, network connections, storage units, and the like (not shown), to facilitate efficient manipulating of the CT scanner 10. In another embodiment, the user interface 44 is a computer and vessel tracker 40 is a software component residing thereon.

Figure 2:
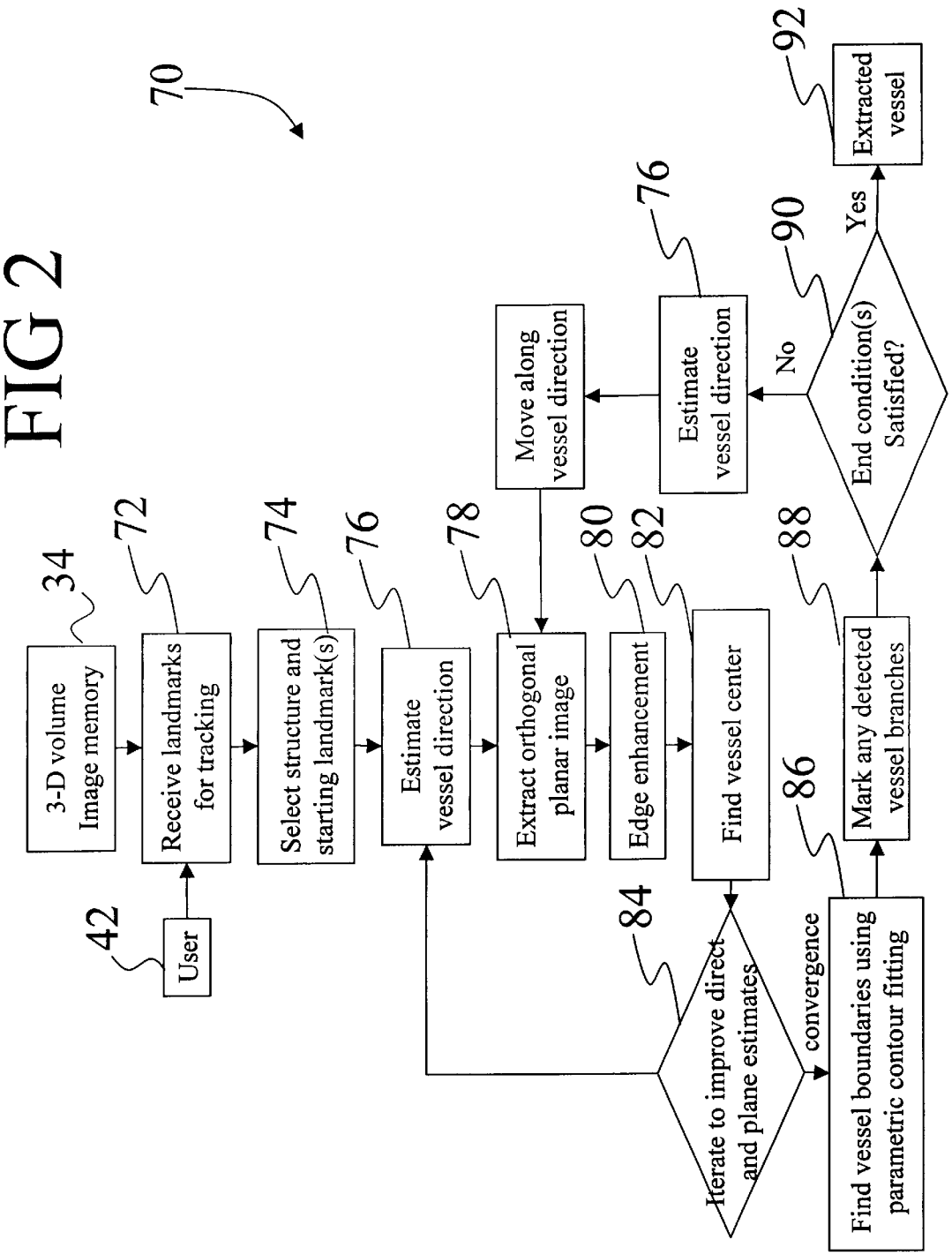
FIG. 2 schematically shows an exemplary method embodiment of the invention.
Figure 3:
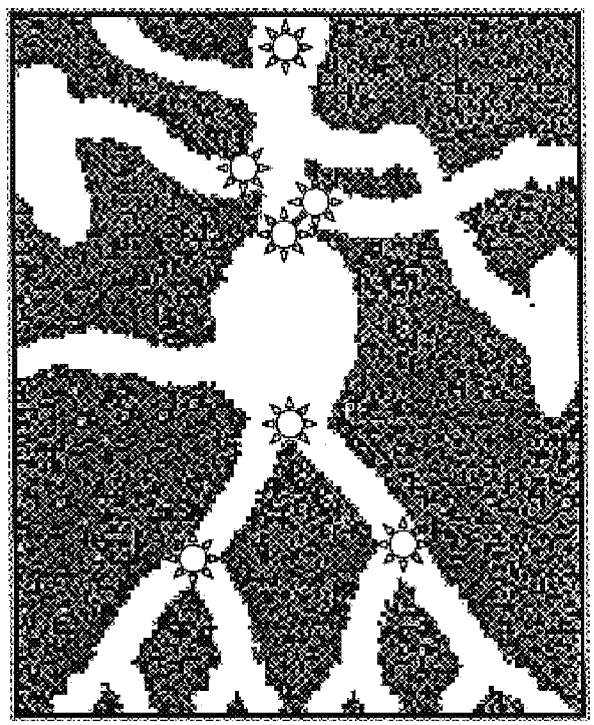
FIG. 3 shows a schematic of a AAA aortic aneurysm with user-selected landmarks superimposed.

With continuing reference to FIG. 1 and with further reference to FIG. 2, an exemplary vessel tracking method 70 embodiment is described. The user 42 is interrogated via the user interface 44 and supplies one or more starting landmarks 72 within the three-dimensional volume image memory 34. Exemplary landmarks for a schematic AAA aortic aneurysm are shown in FIG. 3. In a suitable embodiment, a first landmark serves as an initial vessel center estimate 74, a second landmark serves in cooperation with the first landmark to define an initial vessel direction estimate, and the remaining landmarks serve as termination points. In an exemplary user interface 44 interactive window shown in FIG. 4, the user can select from among several standard types of stents, or can define a custom stent (e.g., "Dr. Smith's favorite protocol"). Based, on the stent type, the user interface 44 preferably prompts for appropriate landmarks which will enable efficient tracking.

With reference returning to FIG. 2, a vessel direction is estimated 76 by extrapolating from at least two vessel center points. The vessel center points are supplied recursively, i.e. corresponding to previously identified vessel centers. To initiate the tracking direction, two selected landmarks 72 can be used. In one embodiment, at least three points are used to extrapolate by fitting the points to a spline curve or other suitable curved linear function. In another embodiment, two points are taken at a time and the centerline is tracked between them. To avoid erroneously following a sharp turn corresponding to a branch, one of the landmarks 72 located approximately at the opposite end of the vessel from the starting landmark 72 optionally indicates the principle vessel direction. Another method for avoiding inadvertently following branches is to weight the points used to bias against sharp curving. In yet another suitable embodiment, the vessel direction is obtained by line filtering a finite volume, extracting an inertia matrix, and performing an Eigen analysis of the inertia matrix to yield a vessel direction.

With continuing reference to FIGS. 1 and 2, a normal planar image that is orthogonal to the vessel direction is extracted 78 from the 3-D volume image of memory 46. The size of this plane can be varied based on the size of the vessel being tracked, but in any event it should be at least large enough to contain the entire vessel cross-section. The appropriate orthogonal plane is identified by transforming a plane parallel to the x-y plane into the orthogonal orientation according to:

$$\gamma = \arctan\left(\frac{n_y}{n_x}\right), \quad \phi = \arctan\left(\frac{n_z}{\sqrt{n_x^2 + n_y^2}}\right), \tag{1}$$

where $(n_x, n_y, n_z)$ is the directional normal along the vessel direction 76, $\gamma$ is the angle of the plane with respect to the z-axis, and $\phi$ is the angle of the plane with respect to the y-axis. The transformed coordinates are used to tri-linearly interpolate the image voxels from the 3-D volume image 46.

With the orthogonal plane found, the vessel center is identified within the plane 78. This identification can be complicated by the low signal-to-noise ratio typically associated with multi-slice CT image data. To improve the boundaries' detectability, an edge enhancement 80 is optionally performed. In one embodiment, a Gaussian function convolutional smoothing is applied prior to computing directional component magnitudes to determine the presence of edges. Optionally, these edges can be superimposed onto the image in the display portion of the user interface 44 and the user 42 prompted to visually verify the edge identification. The edge enhancement just described is exemplary only, and other edge enhancement algorithms known to the art can instead be employed. Additionally, especially in the usual case where the aneurysm is in a large vessel such as the aorta, it may be unnecessary to perform any edge enhancement, and the edge enhancement 80 is optionally omitted.

The planar image with optional edge enhancement is analyzed to find the vessel center 82. In an exemplary embodiment, a central measure map is used for this analysis, as will be described in more detail later.

Those skilled in the art will recognize that the accuracy of the vessel center estimation 82 will depend upon the orthogonality of the planar image 80 relative to the actual vessel direction. Since the vessel direction 76 is only an estimate, in one preferred embodiment the an iterative loop 84 is included which uses the found vessel center 82 to update the vessel direction 76. A new orthogonal plane extraction 78 is performed using the updated direction, optionally edge enhanced 80, and the vessel center analysis 82 performed again. The looping 84 is preferably repeated until a convergence is reached. For the types of large vessels for which stent replacement is typically applied, the vessels are usually straight enough that such an iterative looping will converge in only a few iterations.

Once the vessel center is identified in an optimized orthogonal plane, the vessel boundaries are fitted 86. In a suitable embodiment to be described later herein, parametric contour fitting is used to identify the vessel boundaries in the plane. In the course of the center and boundaries analysis 82, 86 vessel branching may be detected. If so, vessel branches are advantageously marked 88 for possible later tracking. In this way, the tracker can be applied recursively to track a pre-selected portion of the vessels branching off the vessel which is to be replaced by the stent. Such branch tracking is important for stent planning, because the stent is typically anchored to the branch vessels. Irregularities in these branches can adversely affect the stent implantation surgery. Prior knowledge of the these anatomical complications enables improved stent design and surgical planning.

Once the vessel center and boundaries are found, the process recursively iterates until a termination condition is satisfied 90. Selected landmarks 72 optionally identify the termination points. The end result of the recursive tracking is the extracted vessel 92 including an accurate characterization of the aneurysm.

Figure 5:
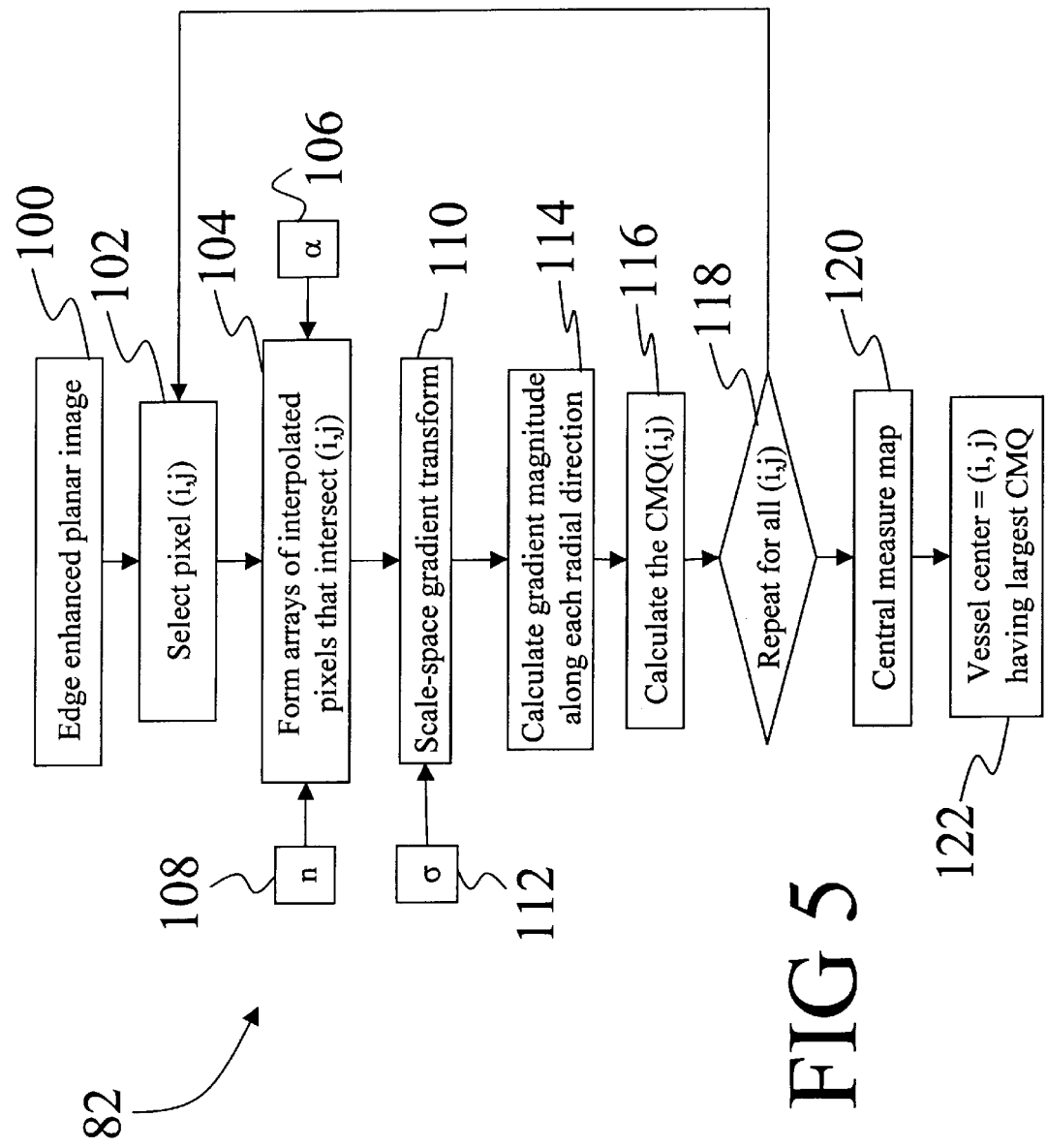
FIG. 5 schematically shows a suitable embodiment of the vessel center finder of FIG. 2.

With continuing reference to FIG. 2 and with further reference to FIG. 5, a suitable embodiment of the vessel center analysis 82 is described. The analysis is performed in the planar image with optional edge enhancement 100. A central measure map is computed as follows.

Figure 6:
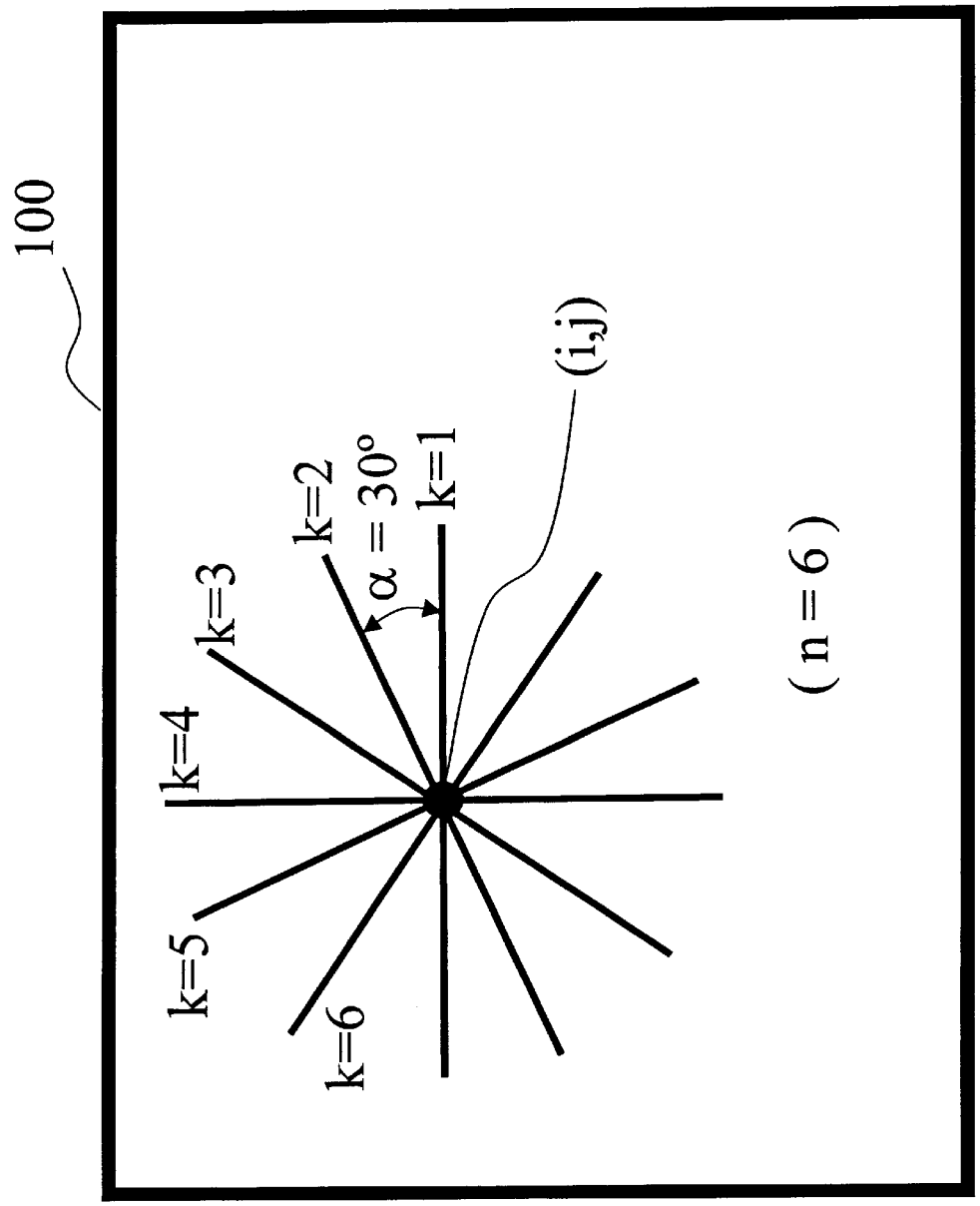
FIG. 6 schematically shows a selection of rays for the central measure map calculation at a point (i,j)

With continuing reference to FIG. 5 and with further reference to FIG. 6, for a pixel (i,j) 102, a plurality of rays are generated 104 which pass through the point (i,j) 102 at a selected angular separation α 106 so that there are n 108 rays generated. In the exemplary FIG. 4 where α=30°, there are n=6 rays indexed by k which radially span about the point (i,j) 102.

For each ray, the gradient is computed 110 by convolving with a gaussian derivative kernel according to:

$$\nabla R(\vec{r},\sigma) = I(\vec{r}) * \sigma^{65} \nabla G(x,\sigma) \qquad (2),$$

where $\vec{r}$=ray, $I(\vec{r})$=image array, and $\sigma^{\gamma}\nabla G(x,\sigma)$=the gaussian derivative kernel where σ is the gaussian variance which serves as a scale factor 112 in the method and is selected based on the size or diameter of the vessel being tracked. Those skilled in the art will recognize that for larger scale factors only the dominant edges will be present after the gradient transform. The factor γ in equation (2) is a normalizing factor corresponding to Lindeberg's power constant which preserves the image characteristics across the gradient transform. G(x,σ) is the well known Gaussian function given by:

$$G(x, \sigma) = \frac{1}{2\pi\sigma^2} e^{\frac{-x^2}{2\sigma^2}}, \qquad (3)$$

and the derivative of the gaussian, defined as:

$$\nabla G(x, \sigma) = \frac{\partial}{\partial x} G(x, \sigma), \qquad (4)$$

is computed using a three-point difference operation, i.e. convolving with a {1, 0, −1} kernel.

A gradient magnitude is calculated 114 along the radial direction according to:

$$\frac{\partial R_{1,2}}{\partial \vec{r}_{1,2}} = \left(\frac{|\nabla R(\vec{r},\sigma)|}{|\vec{r}|}\right)_{\vec{r}_{1,2}=first\ maximums}, \qquad (5)$$

where the subscripts 1,2 refer to the positive and negative directions along the linear image array I(r) and the magnitude of the vector r reaches to the first maximum in the transformed radial array. The central measure map is then generated 116 by transforming each pixel (i,j) 102 according to the transformation:

$$CMQ(i, j) = \frac{1}{n}\sum_{k=1}^{n}\left(\frac{\min\left(\frac{\partial R_1}{\partial \vec{r}_k}, \frac{\partial R_2}{\partial \vec{r}_k}\right)}{\max\left(\frac{\partial R_1}{\partial \vec{r}_k}, \frac{\partial R_2}{\partial \vec{r}_k}\right)}\right). \qquad (6)$$

The CMQ function is indicative of how well centered the point (i,j) is within its surrounding edge boundaries. The calculation of CMQ(i,j) is repeated 118 for each pixel (i,j) 102 to produce the central measure map 120. The vessel center is selected 122 as the point (i,j) having the largest central measure map value CMQ(i,j). Generally, the vessel center will have CMQ close to 1.0 for circular and elliptical borders, with decreases therefrom as vessel edge irregularities increase.

Figure 7:
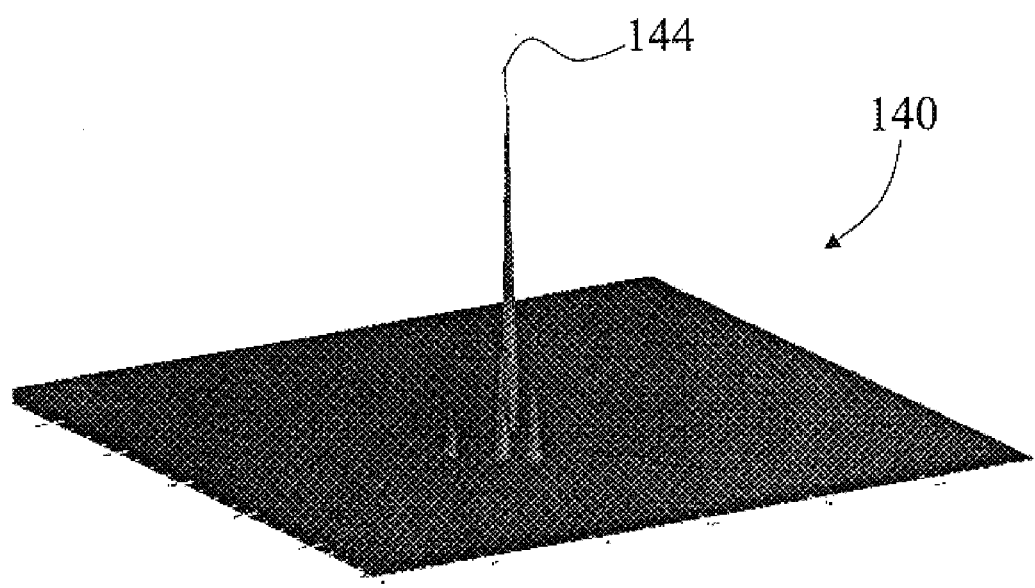
FIG. 7 shows an exemplary central measure map.

With reference to FIG. 7, an exemplary central measure map 140 is shown. The vessel center 144 is identified as the largest value of the central measure map. Additional, much smaller peaks are also seen in the central measure map, corresponding to smaller nearby vessels or other anatomical structures. Those skilled in the art will recognize that at a vessel branch there will be a merging of the central measure map peaks of the main vessel and a smaller branch coming off. Such a merging can be detected to facilitate marking of branches 88 (FIG. 2). The tracking system 70 can then be successively applied for a pre-selected distance to each marked branch to track the branch portion that will be used in anchoring the stent.

With reference returning to FIG. 2, once the vessel center is found 82, an iterative looping 84 is optionally performed which iteratively improves the vessel direction estimate 76 using the found vessel center, extracts an iteratively improved orthogonal plane 78, performs optional edge enhancement 80 of the improved plane, and finds an iteratively improved vessel center 82. The iterative looping 84 corrects for any error in the initial direction estimate due to vessel curving.

With continuing reference to FIG. 2, once the orthogonal plane has been extracted 78 and the optimized vessel center has been located 82, the vessel boundaries are identified 86 within the orthogonal plane. It will be recognized that the central measure map involves estimating vessel boundaries corresponding to the first maximum values. However, since the vessel being tracked contains an aneurysm, these values are insufficient to smoothly track the vessel lumen, especially in the vicinity of the aneurysm. Those skilled in the art will particularly recognize that an aneurysm will typically have a "true" lumen corresponding to the boundaries of the blood flow, as well as a "false" lumen which is larger than the true lumen and corresponds to the vessel boundaries. The distinction arises because plaque or other types of buildup generally occur on the vessel walls of the aneurysm which constrict blood flow. Furthermore, the first maxima used in calculating the central measure map can be inaccurate in regions where vessels branch off, and accurate tracking in these regions is also critical in designing a stent and planning the stent implantation surgery.

With continuing reference to FIG. 2, in a suitable embodiment of the true lumen extraction 86, a dynamic contour spline or snake is arranged passing through the first maxima. The contour is then iteratively adjusted, i.e. the snake is slithered, by optimizing the edge strength with the internal spline energy. In this manner, the contour or snake is iteratively adjusted to match the true lumen boundary. In a suitable contour embodiment, the contour is parametrically defined as:

$$E^*_{snake} = \int_0^1 (E_{int}(v(s)) + E_{image}(v(s)) + E_{con}(v(s))), \quad (7)$$

where $E_{int}$ represents the internal energy of the spline due to bending, $E_{image}$ gives rise to the image edge strength forces, and $E_{con}$ gives rise to the external constraint forces. The internal energy $E_{int}$ comprises a first order term controlled by a parameter $\alpha$ and a second order term controlled by a parameter $\beta$. The image forces are edge strength. In a preferred embodiment, the edge strength is computed in a manner similar to the scale-based gradient magnitude at any given image point. Those skilled in the art will recognize that this edge strength is different from conventional snake approaches. The constraint energy $E_{con}$ in this dynamic contouring embodiment is $1/r$ where r is the radius of the cross-sectional vessel.

Figures 8A, 8B:
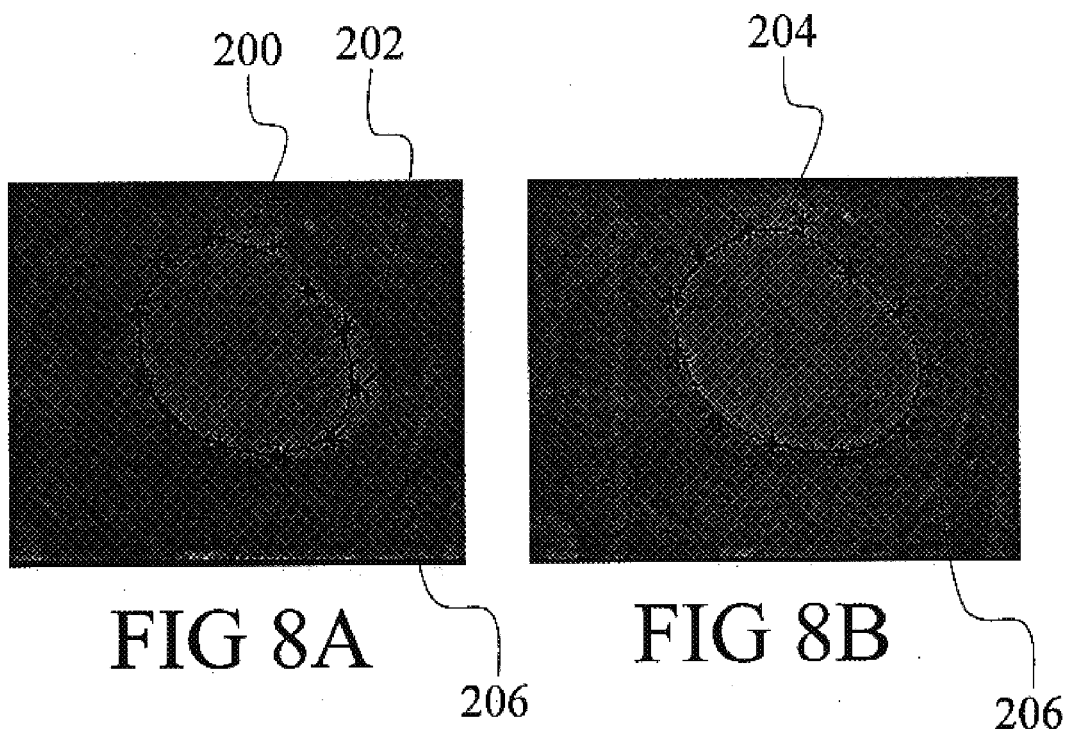
FIG. 8A shows an initial dynamic contour spline or snake to be used to fit the true lumen.
FIG. 8B shows the fitted dynamic contour spline or snake corresponding to FIG. 8A.

FIG. 8A shows an image slice of an aneurysm with a typical initial vessel contour 200 superimposed, with the maxima of the central measure map calculation shown as asterisks (*). It is seen that the initial contour 200 inadequately describes the true vessel lumen; for example, a portion 202 of the true vessel lumen is poorly fitted. FIG. 8B shows the fitted contour 204 which closely matches the true vessel lumen. Those skilled in the art will also recognize a false vessel lumen 206 in both FIG. 8A and FIG. 8B, which is not fitted. However, it is contemplated that the dynamic contour spline or snake of equation (7) can also be employed to fit the false vessel lumen by merely adjusting the parameters of the snake to fit the lower intensity false lumen. In a suitable embodiment, the snake of FIG. 8B would be enlarged by a pre-selected amount, e.g. 30%, and the fitting with the adjusted snake parameters performed to iteratively fit the false lumen.

Figure 4:
FIG. 4 shows an exemplary user interface window for user selection of the stent type.
Figure 9:
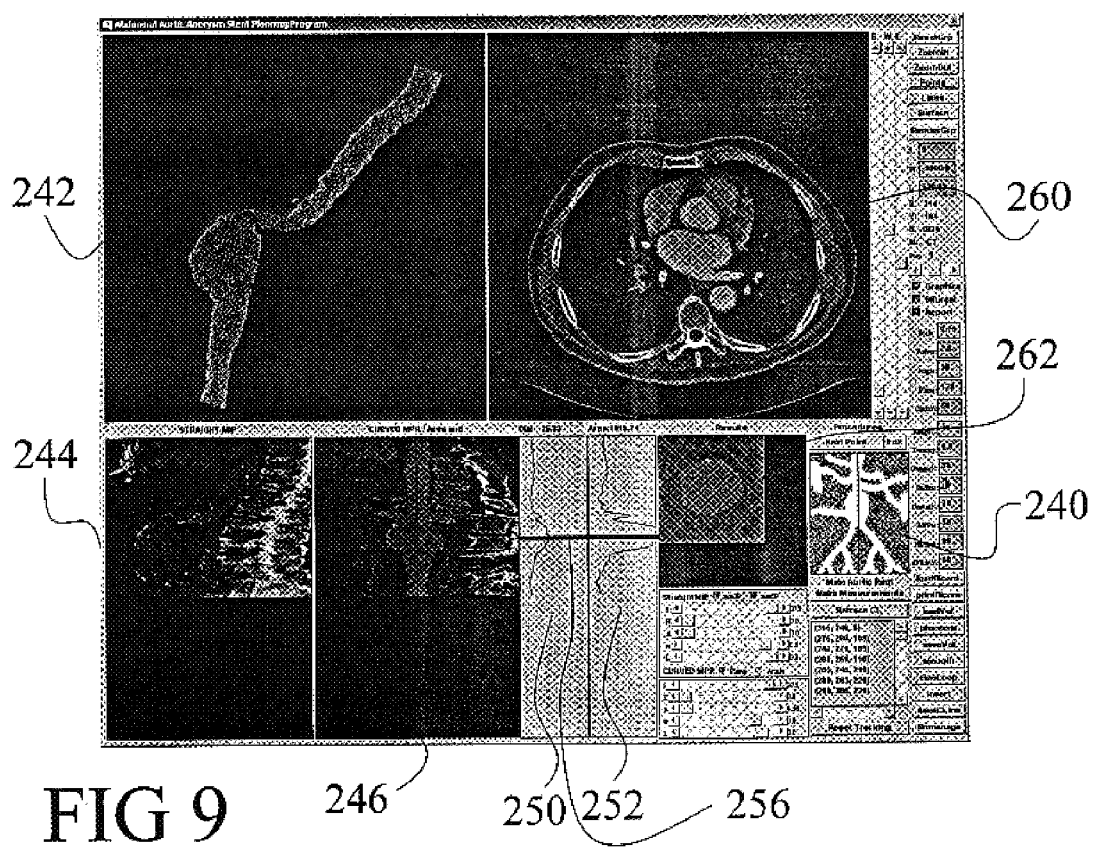
FIG. 9 shows an exemplary user interface for performing stent measurements and stent implantation planning in accordance with an embodiment of the invention.

With reference to FIG. 9, a suitable work environment incorporating an embodiment of the invention is described. The type of stent to be employed, selected previously for example as shown in FIG. 4, is shown schematically 240 for the user's reference. In the exemplary FIG. 9, a AAA aortic aneurysm is selected. The tracked vessel and selected branch portions, suitably obtained using the apparatus and method of FIGS. 1 and 2, is rendered in 3-D 242, optionally in a rotatable format. However, because many medical personnel are used to viewing in maximum intensity projection (MIP) format 244 or in multi-planar re-format (MPR) 246, these images are also provided. Quantitative information is provided in other windows. A linear rendition of the vessel lumen diameter 250 and area 252 are shown with respect to the tracked vessel centerline. These plots are generated by plotting the vessel diameter or the vessel area versus a distance along the centerline from a reference vessel center. The plots 250, 252 allow accurate and intuitive identification of the thickest portion of the aneurysm 256. Quantitative measurements are performed at selected slices 260, and the vessel of the slice is displayed in enlarged format 262.

Figure 10:
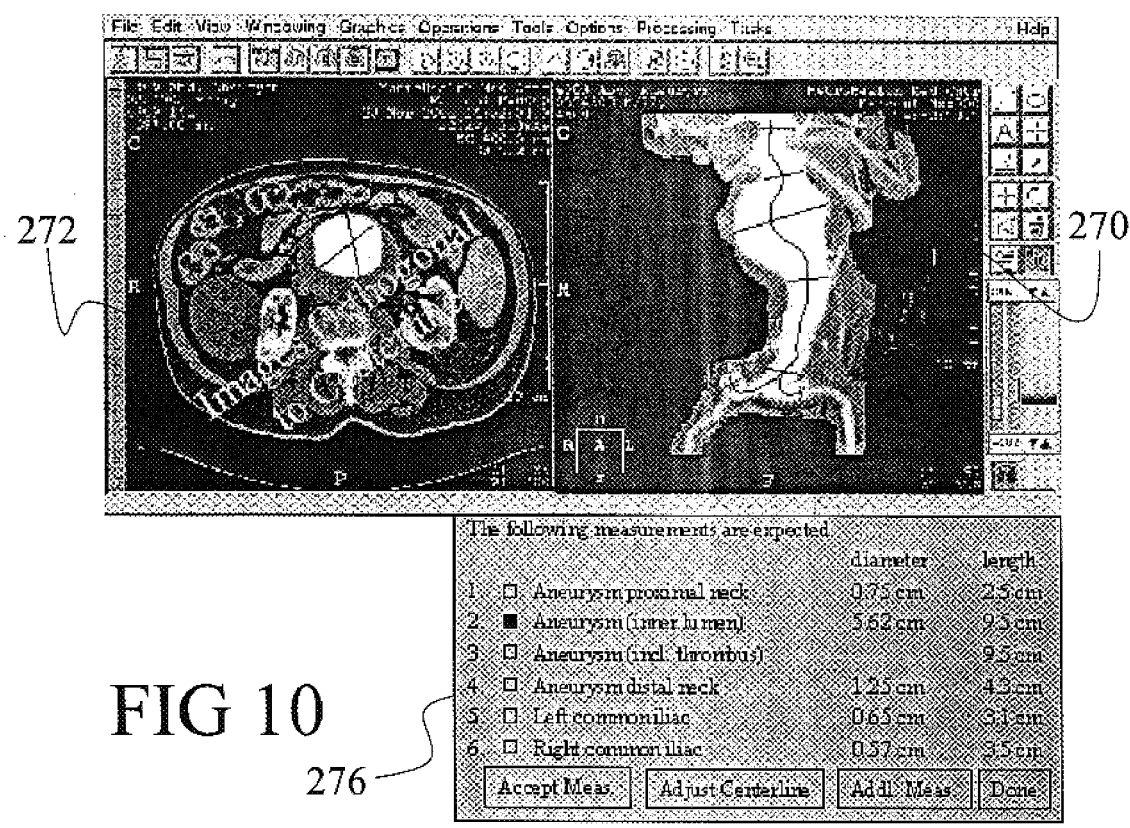
FIG. 10 shows a suitable user interface for performing and verifying the stent measurements.

With continuing reference to FIG. 9 and with further reference to FIG. 10, a suitable embodiment for calculating stent parameters is described. A 3-D rendering, optionally rotatable, of the tracked vessel containing the aneurysm and selected branch portions is shown 270. The slice at which cross-sectional measurements are being performed is also shown 272. Since the stent is schematically known 240, the appropriate measurements used by the stent manufacturer are advantageously shown, e.g. in a measurements table 276. The measurements are shown to scale superimposed on the images 270, 272, allowing medical personnel to visually check the accuracy and reasonableness of the measurements. Optionally, the user can select a parameter to measure or view through the table 276. This exemplary user interface ensures that all the standard measurements are supplied to the stent manufacturer, and facilitates easy and intuitive verification of the stent parameters.

Figure 11:
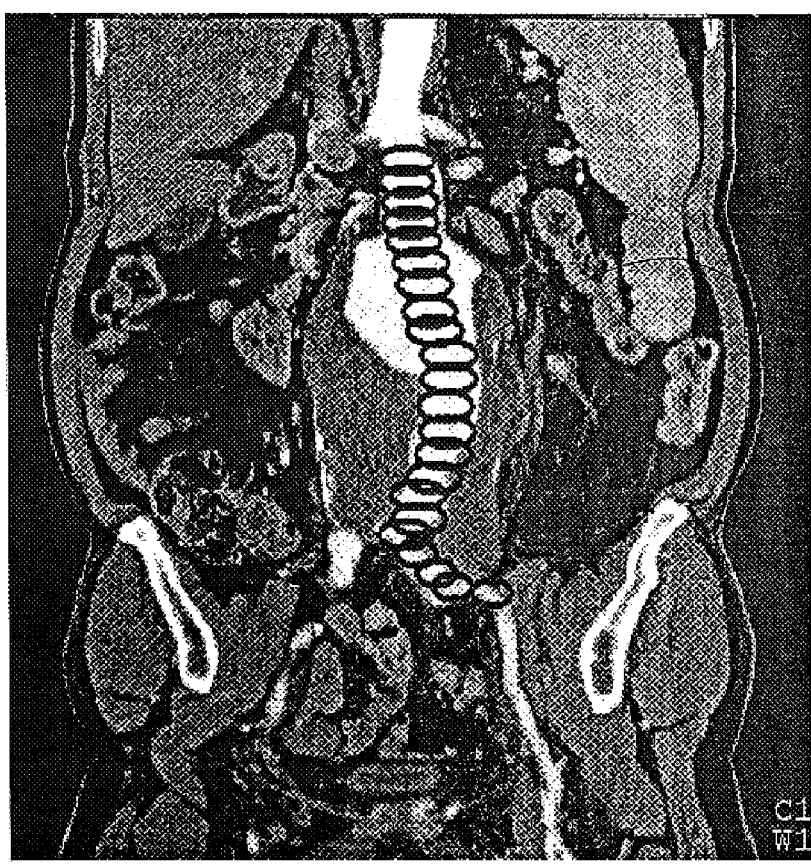
FIG. 11 shows a suitable display of the stent structure superimposed on a vascular image.

With continuing reference to FIGS. 9 and 10, and with further reference to FIG. 11, once the stent measurements have been selected, the stent structure 280 is advantageously calculated and displayed superimposed on CT image data 282. Although FIG. 11 shows a projection image, it is also contemplated that the stent structure 280 be superimposed on a 3-D tracked vessel rendition 242, 270 which is optionally rotatable. The graphical display of FIG. 11 further ensures through an intuitive graphical displaying that the stent structure which will be ordered is appropriate and correct.

The invention has been described with reference to the preferred embodiments obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for tracking a blood vessel containing an aneurysm in a three-dimensional image, the method comprising:
   identifying a blood vessel type;
   receiving vascular landmarks from an associated user;
   extracting an orthogonal vessel plane;
   locating a vessel center in the vessel plane;
   fitting vessel edges in the vessel plane; and
   recursively repeating the extracting, locating, and fitting a plurality of times to track the vessel.

2. The method as set forth in claim 1, wherein the identifying of a blood vessel type includes:
   displaying at least one stent type to the user; and
   receiving a stent type selection from the user.

3. The method as set forth in claim 1, wherein the estimating of a vessel direction includes:
   interpolating a direction using at least two landmarks.

4. The method as set forth in claim 1, wherein the locating of a vessel center in the vessel plane includes:
   constructing a central measure map; and
   identifying the vessel center as an extremum of the central measure map.

5. The method as set forth in claim 1, wherein the fitting of vessel edges in the vessel plane includes:
   arranging a parametric snake about the vessel center; and
   iteratively fitting the parametric snake to the vessel boundaries.

6. The method as set forth in claim 5, wherein the iterative fitting of the parametric snake includes:
   parameterizing the edge strength using at least a scale-based gradient magnitude.

7. The method as set forth in claim 5, wherein the iterative fitting of the parametric snake includes:
   a true lumen fitting which iteratively fits the snake to the true vessel lumen; and
   a false lumen fitting which iteratively fits the snake to the false vessel lumen.

8. The method as set forth in claim 7, wherein the iterative fitting of the parametric snake further includes:
   subsequent to the true lumen fitting and prior to the false lumen fitting, increasing the snake size by a preselected amount.

9. A method for assisting an associated user in planning implanting a stent in a blood vessel in an associated patient, the method comprising:
   acquiring a three-dimensional vascular image including imaging of the blood vessel in which the stent is to be implanted;
   tracking the vessel to be replaced in the three-dimensional vascular image, said tracking including at least extraction of a vessel centerline and vessel boundaries;
   receiving from the user a stent type;
   displaying a table of measurements corresponding to the received stent type; and
   measuring stent parameters based on the vessel tracking.

10. The method as set forth in claim 9, wherein the measuring of stent parameters includes:
    measuring a stent parameter responsive to a user selection of an element of the table of measurements.

11. A method for assisting an associated user in planning implanting a stent in a blood vessel in an associated patient, the method comprising:
    acquiring a three-dimensional vascular image including imaging of the blood vessel which is to receive the stent;
    receiving vascular landmarks from the user;
    tracking the vessel to receive the stent in the three-dimensional vascular image, the vascular landmarks being used in the tracking, said tracking including at least extraction of a vessel centerline and vessel boundaries; and
    measuring parameters for the stent to be implanted based on the vessel tracking.

12. A method for assisting an associated user in planning implanting a stent in a blood vessel in an associated patient, the method comprising:
    acquiring a three-dimensional vascular image including imaging of the blood vessel in which the stent is to be implanted;
    tracking the vessel in which the stent is to be implanted in the three-dimensional vascular image, said tracking including at least extraction of a vessel centerline and vessel boundaries of at least a portion of a stent anchor vascular branch; and
    measuring stent parameters based on the vessel tracking.

13. The method as set forth in claim 12, further including:
    receiving from the user an indication of a type of stent to be implanted.

14. The method as set forth in claim 12, further including:
    displaying the measured stent parameters graphically superimposed on a rendering of the acquired vascular image.

15. The method as set forth in claim 12, further including:
    constructing a stent structure in 3-D based on the measured stent parameters; and
    superimposing the stent structure on a rendering of the acquired vascular image.

16. The method as set forth in claim 12, wherein the acquiring of a three-dimensional vascular image includes one of:
    magnetic resonance imaging;
    computed tomography imaging; and
    nuclear medicine imaging.

17. The method as set forth in claim 12, wherein the acquiring of a three-dimensional vascular image includes:
    transmitting an x-ray beam through the associated patient; and
    measuring x-ray absorption by the patient.

18. An apparatus for measuring parameters preparatory to a stent replacement of an aneurytic blood vessel in an associated patient, the apparatus comprising:
    a computed tomography (CT) scanner for acquiring image data corresponding to multiple two-dimensional image slices;
    a reconstruction processor for reconstructing a three-dimensional image representation from the image data;
    a tracking processor for producing a tracked vessel including at least a centerline and selected vessel boundaries; and
    a user interface for:
      displaying a rendering of the image representation to an associated user, receiving from the user a stent type selected for implanting, measuring selected vascular parameters corresponding to stent parameters, graphically superimposing a representation of a stent with the measured stent parameters on the rendering of the image representation, and displaying a table of measurements corresponding to the selected stent type.

19. The apparatus as set forth in claim 18, wherein the tracking processor further produces a tracked vessel branch including at least a centerline and selected vessel boundaries of the tracked branch along a preselected length thereof.

20. An apparatus for measuring parameters preparatory to implanting a stent in an aneurytic blood vessel in an associated patient, the apparatus comprising:

a computed tomography (CT) scanner for acquiring image data corresponding to multiple two-dimensional image slices;

a reconstruction processor for reconstructing a three-dimensional image representation from the image data;

a tracking processor for producing a tracked vessel including at least a centerline and selected vessel boundaries; and a user interface including a means for selecting a stent type and a means for receiving vascular landmarks from the user, the user interface performing a method including:

displaying a rendering of the image representation to an associated user, measuring selected vascular parameters corresponding to the stent parameters, and graphically superimposing the measured parameters on the rendering of the image representation.

21. An apparatus for measuring parameters preparatory to implanting a stent in an aneurytic blood vessel in an associated patient, the apparatus comprising:

a computed tomography (CT) scanner for acquiring image data corresponding to multiple two-dimensional image slices;

a reconstruction processor for reconstructing a three-dimensional image representation from the image data;

a tracking processor for producing a tracked vessel including at least a centerline and selected vessel boundaries; and a user interface for:

displaying a rendering of the image representation to an associated user, plotting at least one of a vessel diameter and a vessel area versus a distance along the centerline from a reference vessel center, and graphically superimposing a depiction of a selected stent type on the image representation.

22. The apparatus as set forth in claim 21, wherein the user interface identifies the aneurysm as corresponding to one of the largest plotted vessel diameter and the largest plotted vessel area.

23. An apparatus for measuring stent parameters preparatory to a stent implanting operation, the apparatus comprising:

a means for acquiring three-dimensional image data;

a means for reconstructing the image data into a three-dimensional image representation;

a means for tracking the blood vessel which is to receive the stent, said tracking including at least estimation of a vessel centerline and selected vessel boundaries in three-dimensions, said tracking means including a means for identifying vessel branches which branch off the blood vessel to receive the stent and a means for tracking at least a portion of the identified vessel branches;

a means for displaying a rendering of the image representation to an associated user; and a means for measuring selected vascular parameters corresponding to parameters of a properly sized stent.

24. An apparatus for measuring stent parameters preparatory to a stent implanting operation, the apparatus comprising:

a means for acquiring three-dimensional image data;

a means for reconstructing the image data into a three-dimensional image representation;

a means for tracking the blood vessel which is to receive the stent, said tracking including at least estimation of a vessel centerline and selected vessel boundaries in three-dimensions, said tracking means including a means for identifying vessel branches which branch off the blood vessel to receive the stent and a means for tracking at least a portion of the identified vessel branches;

a means for displaying a rendering of the image representation to an associated user; and a means for measuring selected vascular parameters corresponding to parameters of a properly sized stent.

25. The apparatus as set forth in claim 23, further including:

a means for constructing a three-dimensional representation of a stent structure based on the measured parameters; and a means for graphically superimposing the stent structure on the displayed renderingt of the image representation.

* * * * *